US009961613B2

(12) United States Patent
Nathan et al.

(10) Patent No.: US 9,961,613 B2
(45) Date of Patent: May 1, 2018

(54) DISTRACTION PREVENTION SYSTEM FOR MOBILE DEVICES

(71) Applicant: RiVE TECHNOLOGIES, INC., Wilmington, DE (US)

(72) Inventors: Tyler Marshall Nathan, Scarsdale, NY (US); Matthew P. Csillag, Syosset, NY (US); Richard Rubin, Fairfield, NJ (US); Kai Lin, New York, NY (US); Mario A. Turchi, Tenafly, NY (US); Steven Madsen, New York, NY (US); Kurt Laurence Shuster, Scarsdale, NY (US); Bruce Meeks, Jr., Miccousukee, FL (US)

(73) Assignee: RIVE TECHNOLOGIES, INC., Wilmington, DE (US)

( * ) Notice: Subject to any disclaimer, the term of this patent is extended or adjusted under 35 U.S.C. 154(b) by 0 days. days.

(21) Appl. No.: 15/487,886

(22) Filed: Apr. 14, 2017

(65) Prior Publication Data

US 2017/0303185 A1    Oct. 19, 2017

Related U.S. Application Data

(60) Provisional application No. 62/322,675, filed on Apr. 14, 2016.

(51) Int. Cl.
*H04W 48/04* (2009.01)
*H04W 4/04* (2009.01)
(Continued)

(52) U.S. Cl.
CPC ............ *H04W 48/04* (2013.01); *G08B 21/18* (2013.01); *H04M 1/72577* (2013.01); *H04W 4/046* (2013.01)

(58) Field of Classification Search
CPC ...... G08B 21/18; H04W 4/046; H04W 48/04; H04M 1/72577
See application file for complete search history.

(56) References Cited

U.S. PATENT DOCUMENTS 8,320,884 B1 * 11/2012 Khanna ............. H04M 1/72577
340/506
8,706,143 B1 * 4/2014 Elias ..................... H04W 48/04
455/1
(Continued)

FOREIGN PATENT DOCUMENTS

KR        1020150142401        12/2015

OTHER PUBLICATIONS

Bsafemobile , "The Distracted Driving Solution for Families and Small Business", available at: http://bsafemobile.com/ retrieved on Oct. 18, 2017, 7 pages.
(Continued)

*Primary Examiner* — Nathan Mitchell
(74) *Attorney, Agent, or Firm* — Kilpatrick Townsend & Stockton LLP (57) ABSTRACT

A system for minimizing driver distractions from a mobile device can include a blocking device and a blocking engine. The blocking device can include a first end, a second end, a cable, and a control board. The first end can include a first connector for coupling to a first port of a mobile device. The second end can include a second connector for coupling to a second port of a vehicle to receive a power signal from the vehicle. The cable can connect the first end to the second end. The control board can determine when movement of the vehicle exceeds a threshold value and transmit a launch signal. The blocking engine can receive the launch signal from the control board and launch a mobile application on the mobile device.

23 Claims, 5 Drawing Sheets

(51) Int. Cl.
*H04M 1/725* (2006.01)
*G08B 21/18* (2006.01)

(56) References Cited

U.S. PATENT DOCUMENTS

| | | | | |
|---|---|---|---|---|
| 2008/0146181 A1* | 6/2008 | Mason | ............... | H04L 25/063 455/234.1 |
| 2011/0093161 A1* | 4/2011 | Zhou | ............... | B60W 50/08 701/31.4 |
| 2011/0263293 A1* | 10/2011 | Blake | ............... | B60K 35/00 455/557 |
| 2012/0268235 A1* | 10/2012 | Farhan | ............... | G05B 23/0278 340/3.1 |
| 2013/0184933 A1* | 7/2013 | Smith | ............... | G06F 17/00 701/36 |
| 2013/0288722 A1* | 10/2013 | Ramanujam | ............... | H04W 4/14 455/466 |
| 2014/0120890 A1* | 5/2014 | Barrett | ............... | H04W 4/046 455/418 |
| 2014/0235159 A1 | 8/2014 | Komistek | | |
| 2014/0274026 A1* | 9/2014 | Mahar | ............... | H04W 48/04 455/419 |
| 2014/0323111 A1 | 10/2014 | Ning | | |
| 2014/0329513 A1 | 11/2014 | Jacob | | |
| 2015/0079943 A1* | 3/2015 | Williams | ............... | H04W 12/08 455/411 |
| 2016/0014262 A1 | 1/2016 | Hodges et al. | | |
| 2017/0078474 A1* | 3/2017 | Mahar | ............... | H04W 48/04 |
| 2017/0214787 A1* | 7/2017 | Moir | ............... | H04B 5/0031 |

OTHER PUBLICATIONS

Cellcontrol, "Enforceable Technology to Stop Distracted Driving for Companies and Families", available at: www.cellcontrol.com retrieved on Oct. 18, 2017, 9 pages.

Cogosense, "The pioneer and leader in creating solutions to address the problem of distracted driving due to mobile device use", available at http://www.cogosense.com/distracted-driving/index.php retrieved on Oct. 18, 2017, 4 pages.

Drive Safe.ly, "The App to Stop Distracted Driving", available at http://www.drivesafe.ly/ retrieved on Oct. 18, 2017, 2 pages.

Fleetguardian, "Prevent Distracted Driving", available at: https://www.fleetguardian.com/ retrieved on Oct. 18, 2017, 3 pages.

Fleetsafer, "The Distracted Driving Solution for Enterprises" available at http://www.fleetsafer.com retrieved on Oct. 18, 2017, 1 page.

Katasi Groove, "Making Distracted Driving an Unacceptable Human Behavior", available at www.katasi.com retrieved on Oct. 18, 2017, 3 pages.

Kyrus Mobile, "Distracted Driving Safety Solutions", available at http://www.kyrusmobile.com/ retrieved on Oct. 18, 2017, 2 pages.

Origoconnect, "A revolution in fleet safety is here", available at http://origoconnect.com retrieved on Oct. 18, 2017, 3 pages.

International Patent Application No. PCT/US2017/027661, International Search Report and Written Opinion, dated Sep. 11, 2017, 10 pages.

Sprint, "Stop the distractions and shift focus to the road", available at: https://www.sprint.com/landings/focusondriving/index.html retrieved on Oct. 18, 2017, 2 pages.

\* cited by examiner

DISTRACTION PREVENTION SYSTEM FOR MOBILE DEVICES

CROSS REFERENCE TO RELATED APPLICATIONS

This disclosure is related to and claims the benefit of priority of U.S. Provisional Application No. 62/322,675, titled "Distraction Preventions System for Mobile Devices" and filed on Apr. 14, 2016, which is hereby incorporated in its entirety by this reference.

TECHNICAL FIELD

The present disclosure relates generally to controlling access to functions available via a mobile device while driving. More specifically, but not by way of limitation, this disclosure relates to a distraction prevention system for mobile devices.

BACKGROUND

Driver distraction is a leading cause of vehicular accidents. Using a mobile device while driving may cause a number of different distractions to the driver. In some aspects, a device can be used to prevent cellular signals from being transmitted or received by mobile devices within a vehicle. But, these devices can be over inclusive preventing the use of mobile devices by passengers and preventing the performance of applications that can aid a driver.

SUMMARY

The present disclosure describes systems and methods of preventing drivers from being distracted by mobile devices. In some aspects, a system for minimizing driver distractions from a mobile device can include a blocking device and a blocking engine. In some examples, the blocking device can include a cable with a first end and a second end. The first end can include a first connector that can couple to a port of the mobile device. The second end can include a second connector that can couple to a port of a vehicle to receive power from the vehicle. In additional or alternative examples, the blocking device can include a docking bay embedded in a vehicle and the docking bay can include a connector for coupling to a port of the mobile device. In additional or alternative examples, the blocking device can include a shield that can block user access to a home button of the mobile device when the mobile device is coupled to the first connector.

The blocking device can further include a control board that can determine when movement of the vehicle exceeds a threshold value and communicate a launch signal to the mobile device in response to determining that the movement of the vehicle exceeds the threshold value. The blocking engine can operate on the mobile device to and receive the launch signal from the control board. The blocking engine can launch a mobile application on the mobile device in response to receiving the launch signal. The mobile application can delay a display of a notification received by the mobile device while the blocking device is coupled to the mobile device until the blocking device is decoupled from the mobile device.

These illustrative aspects and features are mentioned not to limit or define the invention, but to provide examples to aid understanding of the inventive concepts disclosed in this application. Other aspects, advantages, and features of the present invention will become apparent after review of the entire application.

BRIEF DESCRIPTION OF THE FIGURES

These and other features, aspects, and advantages of the present disclosure are better understood when the following Detailed Description is read with reference to the accompanying drawings, where.

DETAILED DESCRIPTION

Certain aspects and features relate to a distraction prevention system for mobile devices. The distraction prevention system can include a blocking device for restricting access by a driver to certain functions of a mobile device during motion of a vehicle in an effort to prevent distractions to the driver. The blocking device may include a cable for coupling the mobile device to the vehicle. The cable can include a control board for transmitting a launch signal to the mobile device to cause the mobile device to launch a mobile application that restricts the functions of the mobile device during motion of the vehicle. The cable can include a shield for covering a button of the mobile device that allows the driver to close or minimize mobile applications (e.g., a "home" button). The cable can also allow the mobile phone to be charged by the vehicle.

In some examples, the blocking device includes a cable with a clip-end unit and a base-end unit. The clip-end unit may include a connector, such as a lightning connector or a micro-universal serial bus ("micro-USB") connector, which may connect the blocking device to a compatible port of a mobile device. The connector may transmit power from a vehicle, through the blocking device, to the mobile device to charge a battery of the mobile device. The connector may also transmit a signal from the blocking device to cause the mobile device to launch the mobile application for restricting functions of the mobile device during motion of the vehicle. The clip-end unit may include a shield that is shaped to cover a "home," "menu," or other button of the mobile device that would allow a driver to close or minimize mobile applications running in the foreground of the mobile device. The shield may inhibit access to the "home" button to restrict the driver's ability to close or minimize the mobile application or to launch other mobile applications that may distract the driver from operating the vehicle.

The base-end unit may include a connector, such as a universal serial bus ("USB") connector, that may connect the blocking device to a compatible port in the vehicle. The blocking device may receive power signals from the vehicle via the connector to power one or more electrical components housed in the base-end unit of the blocking device. In some aspects, the electrical components housed in the base-end unit may include an accelerometer, a control board, one or more indicator devices, and a battery. The accelerometer may detect the movement of the blocking device in response to movement of the vehicle and may transmit a signal indicating such movement to the control board. The control board may receive the signal from the accelerometer and actuate the indicator devices when movement is detected by the accelerometer and no connection is detected between the blocking device and the mobile device. For example, the indicator devices may include a speaker that may generate an audible tone to alert a driver that the mobile device is not connected to the blocking device. The battery may provide power to one or more of the electrical components when the blocking unit is not connected to, or not receiving power from, the vehicle via the connector.

In additional or alternative examples, the control board may include a communication module that may transmit information associated with the use of the blocking device to a remote system, such as a cloud-based system. For example, the control board may transmit a first message to the cloud when the accelerometer indicates that the vehicle is in motion, but no connection is detected between the blocking device and the mobile device. The control board may transmit a second message to the cloud when the connection between the blocking device and the mobile device is detected. The messages may be used to determine time intervals when a driver is operating the vehicle without using the blocking device being properly connected. In additional or alternative examples, the control board may transmit a signal to the mobile device via a Bluetooth or USB connection. The signal can request a cellular transceiver in the mobile device to communicate a message to the cloud-based system via a wireless telecommunications network.

According to other aspects of the present disclosure, a mobile device may include a processing device and a memory device that is coupled to the processing device and includes a blocking engine for causing the processing device to restrict user access to certain functions of the mobile device when the mobile device is connected to a vehicle via a blocking device. For example, the blocking engine may cause the processing device to mute, mask, or otherwise block notifications received by the mobile device. For example, the notifications may be received by the mobile device, stored in the memory device, and prevented from being displayed by the mobile device until the mobile device is detached from the blocking device.

In some aspects, the blocking engine may cause the processing device to generate one or more user interfaces including selection options for allowing the user to access one or more functions of the mobile device. For example, the blocking engine may cause the processing device to display a user interface including selectable icons to allow the user to play music using the mobile device or access a navigation application through the mobile device. In some examples, the blocking engine can determine a subset of the applications installed on a mobile to allow a user to access while the application is running. The subset can be created by determining a type for each of the applications and allowing applications with a type that includes music or navigation assistance.

In additional and alternative aspects, the blocking engine may cause the processing device to track metrics related to a usage of the blocking device. For example, the blocking engine may cause the processing device to collect usage information related to (1) a time that the mobile device is connected to the blocking device, (2) a time that the mobile device is disconnected from the blocking device, and (3) a time that the vehicle is in motion. The processing device may use this information to determine a duration of time that the mobile device is coupled to (or positioned in) the blocking device while the blocking device is activated (e.g., when the blocking device is receiving power from the vehicle). The processing device may also use this information to determine a duration of time that the vehicle is in motion with and/or without the mobile device coupled to (or positioned in) the blocking device. The blocking engine may cause the mobile device to transmit the usage information to a cloud.

In some aspects, the time that the mobile device is connected to the blocking device can be determined by the blocking engine and/or the blocking device. The blocking device can turn on a Bluetooth transceiver in response to detecting that the vehicle is moving or in response to receiving power from the vehicle. The Bluetooth transceiver can search for the mobile device. In some examples, the blocking device can be paired to the mobile device and can ignore other Bluetooth devices within the vehicle. The blocking device can wirelessly couple to the mobile device via Bluetooth and send alerts to the mobile device to be displayed to the user. The alerts can request that the user couple the mobile device to the blocking device via a USB cable. Once coupled via USB, the blocking device can turn off the Bluetooth transceiver and record the time as a connection time of the blocking device with the mobile device. In some aspects, the time that the vehicle is in motion may be collected by using the accelerometer of the blocking device to sense movement of the blocking device or, by extension, the vehicle. In additional or alternative aspects, the blocking engine can query an application program interface ("API") that performs activity recognition (e.g., the Google Activity Recognition Cloud Service) to determine a state of the mobile device. In some examples, the blocking engine can determine a movement of the vehicle based on the API indicating that the mobile device is in a moving vehicle. In additional or alternative examples, the blocking engine can determine the vehicle is moving by tracking a GPS location of the mobile device.

A blocking device or mobile device according to aspects of the present disclosure may be useful to reduce distractions to a user of the mobile device while the user is driving a vehicle. Statistics show that driver distraction is a leading cause of vehicular accidents in the United States. Using a mobile device while driving may cause a number of different distractions, including: (1) visual distractions that take the driver's eyes off of the road, (2) manual distractions that take the driver's hands off of the steering wheel to pick up and/or operate the mobile device, and (3) cognitive distractions that take the driver's primary attention away from the task of driving (e.g., indicator that signals receipt of a text message). A blocking device may aid in decreasing each of these distractions by reducing the available functionality of the mobile device during operation of the vehicle and by preventing the transmission of notifications received by the mobile device until the driver has completed the task of driving.

These illustrative examples are provided to introduce the reader to the general subject matter discussed here and are not intended to limit the scope of the disclosed concepts. The following sections describe various additional aspects and examples with reference to the drawings in which like numerals indicate like elements, and directional descriptions are used to describe the illustrative examples but, like the illustrative examples, should not be used to limit the present disclosure.

Figure 1:
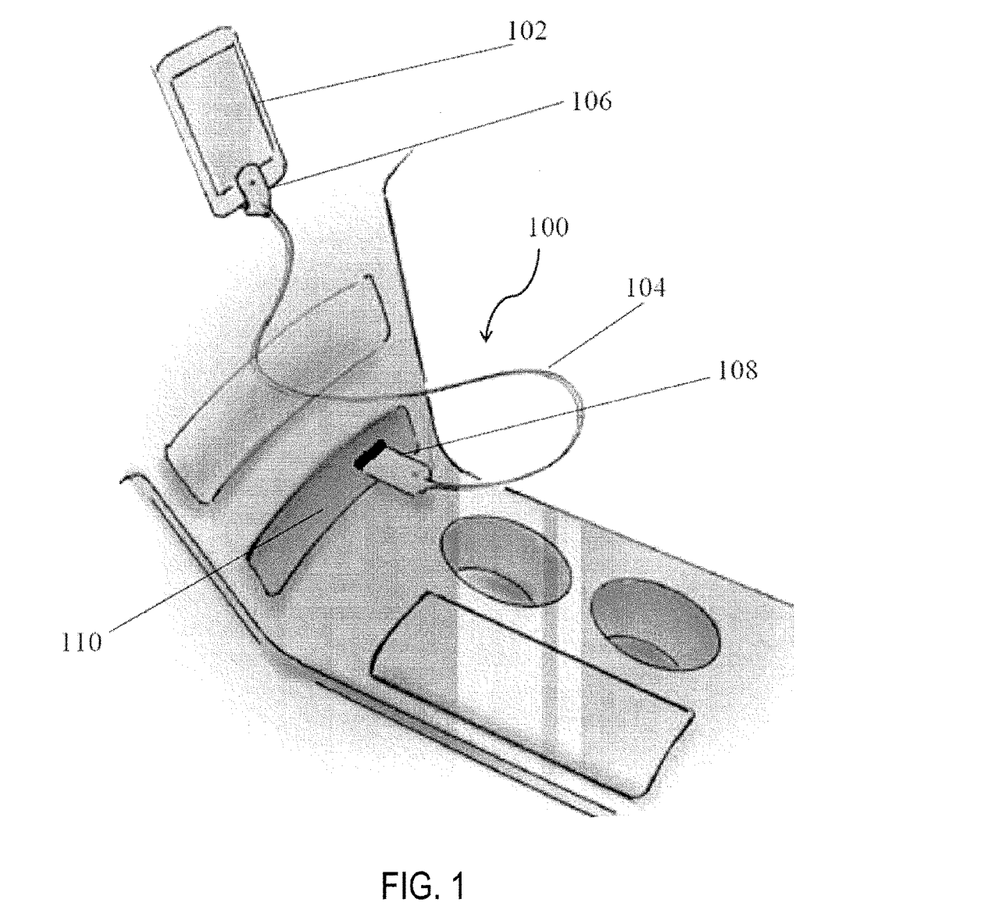
FIG. 1 is a perspective view of an example of a blocking device for preventing a driver of a vehicle from being distracted by a mobile device according to one aspect of the present disclosure.
Figure 2A:
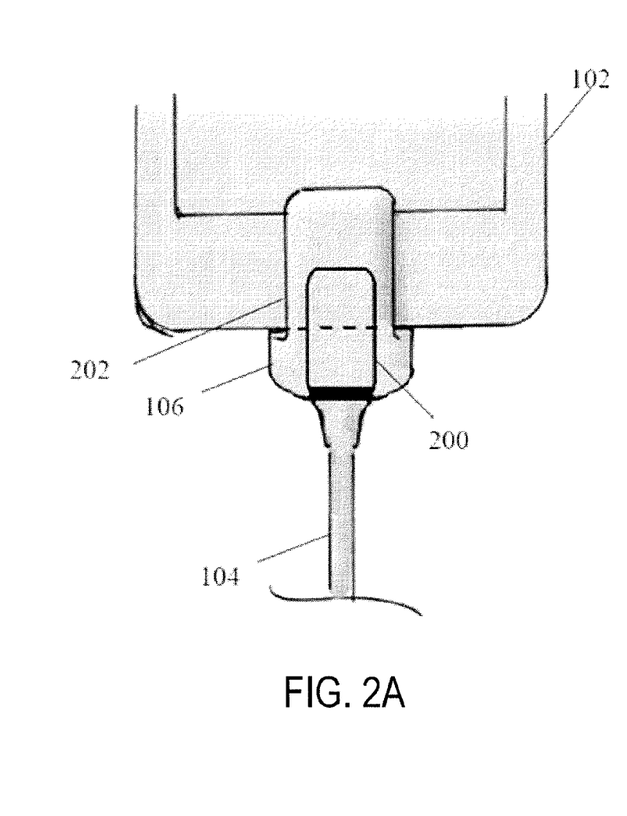
FIG. 2A is a cross-sectional top view of an example of a first end of a blocking device according to one aspect of the present disclosure.
Figure 2B:
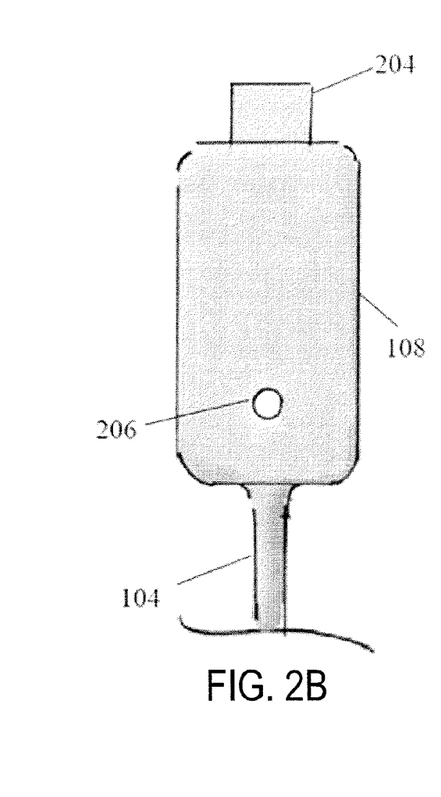
FIG. 2B is a top view of an example of a second end of a blocking device according to one aspect of the present disclosure.

FIGS. 1 and 2A-B show examples of a blocking device 100 according to some aspects of the present disclosure. FIG. 1 depicts a perspective view of the blocking device 100 connected to a mobile device 102 in a vehicle. The blocking device 100 includes a cable 104 having a clip-end unit 106 at one end of the cable 104 and a base-end unit 108 at the opposing end. The clip-end unit 106 may be configured to connect the blocking device 100 to the mobile device 102 via a port in the mobile device 102. The base-end unit 108 may be configured to connect the blocking device 100 to a port or slot in a console 110 of a vehicle. In some aspects, the blocking device 100, when connected to both the mobile device 102 and the console 110, may permit electrical power to be transmitted from a power source in the vehicle to the mobile device 102 to charge a battery positioned in the mobile device 102.

FIGS. 2A-B depict the blocking device 100 of FIG. 1 showing connectors included within the clip-end unit 106 and the base-end unit 108 according to some aspects of the present disclosure. FIG. 2A is a cross-sectional top view of an example of a first end of the blocking device 100. The clip-end unit 106 includes a connector 200 extending from the cable 104. The connector 200 may be shaped to be inserted into a compatible port of the mobile device 102 to couple the blocking device 100 to the mobile device 102. Non-limiting examples of a connector 200 may include a lightning connector, a USB connector, a micro-USB connector, and a mini-USB connector. In some aspects, the connector 200 may be configured to allow electrical signals to pass from the blocking device 100 to the mobile device 102. In other aspects, the connector 200 may be configured to allow electrical signals to pass bidirectionally between the blocking device 100 and the mobile device 102.

The clip-end unit 106 also includes a shield 202. In some aspects, the shield 202 may have a cross-sectional surface area larger than a cross-sectional surface area of the connector 200. The shield 202 may be sized and positioned to cover a "Home," "menu," or other similar button that may allow a user of the mobile device 102 to exit or minimize an application running in the foreground of the mobile device 102 when the connector 200 is positioned in the port of the mobile device 102. In some aspects, the shield 202 may be made out of any resilient material suitable to block access to the "Home" button of the mobile device 102 when the connector 200 is positioned in the port of the mobile device 102. In some aspects, the shield 202 may include similar or identical material to a coating or housing of the cable 104. In one example, the shield 202 may include a rubber material.

FIG. 2B is a top view of an example of a second end of the blocking device 100. The second end includes the base-end unit 108 includes a connector 204. The connector 204 may be shaped and sized for insertion into a port located in a vehicle. The connector 204 may be configured to allow electric signals to pass from the vehicle port to the blocking device 100 to power components positioned internal to the base-end unit 108 of the blocking device 100. In some aspects, the electric signals received by the connector 204 from the vehicle port may traverse the cable 104 and be transmitted to the mobile device 102 through the connector 200 on the clip-end unit 106. Non-limiting examples of the connector 204 may include a USB connector, a vehicle cigarette lighter connector, an on-board diagnostics ("OBD") connector, and an electric plug.

The base-end unit 108 also includes a light-emitting diode ("LED") light 206 that may be visible from an outer surface of the base-end unit 108 to emit a light signal. In some aspects, the LED light 206 may be configured to emit the light signal in an event where the vehicle is in motion, but the blocking device 100 is not connected to the mobile device 102. In some aspects, the LED light 206 may emit light constantly or in a pattern (e.g., flashing in regular intervals). In additional and alternative aspects, the LED light 206 may emit a colored light to indicate that the mobile device 102 is not connected to the blocking device 100. For example, the LED light 206 may emit a green light when the blocking device 100 and the mobile device 102 are connected and a red light when the blocking device 100 and the mobile device 102 are disconnected while the vehicle is in motion. The base-end unit 108 may include one or more electrical components positioned internal to the base-end unit 108 that may facilitate determining when a triggering event is occurring to actuate the LED light 206 and/or other indicator devices included in the blocking device 100.

Although FIGS. 2A-B depict the cable 104 with connector 200 for physically coupling the mobile device 102 to the base-end unit 108, other implementations are possible. In some examples, the base-end unit 108 is embedded in the vehicle and includes a wirelessly connector for wirelessly coupling to a wireless port of a mobile device. The base-end unit 108 can wirelessly charge the mobile device by transmitting power signals via the wireless connector and transmit a launch signal to the mobile device via the wireless connector to cause the mobile device to launch a mobile application.

Figure 3:
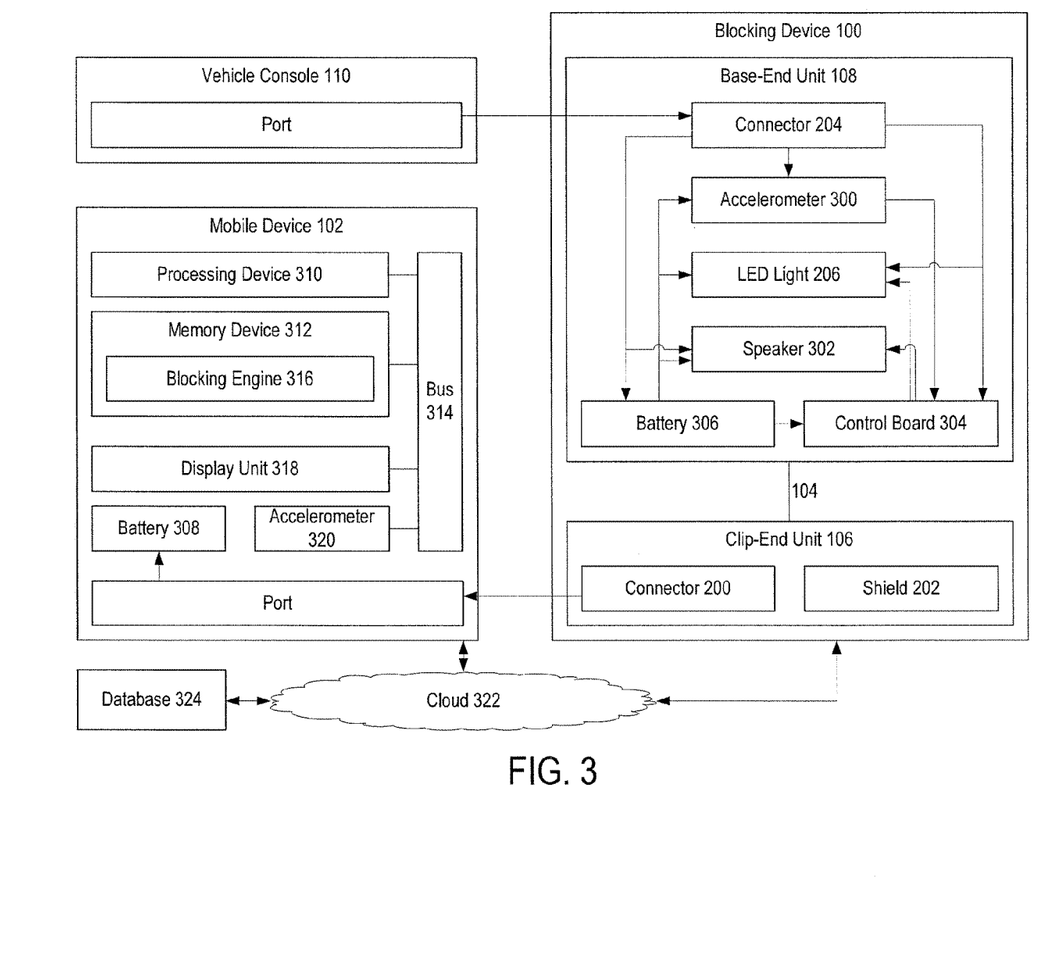
FIG. 3 is a block diagram of an example of a distraction prevention system for a mobile device according to one aspect of the present disclosure.

FIG. 3 is a block diagram of a distraction prevention system including the blocking device 100 and the mobile device 102 of FIGS. 1 and 2A-B. FIG. 3 shows the connector 204 of the base-end unit 108 of the blocking device 100 coupled to a port positioned in the vehicle console 110 as shown in FIG. 1. The base-end unit 108 also includes an accelerometer 300 and two indicator devices, the LED light 206 and a speaker 302. The accelerometer 300 is a device that is configured to measure movement. In some aspects, the accelerometer 300 may include a damped mass that may be displaced by a spring at the same rate as a housing of the accelerometer 300 when the accelerometer 300 experiences movement. The accelerometer 300 may sense movement based on a displacement of the damped mass. The accelerometer 300 may experience movement when the blocking device 100 is positioned in a moving vehicle such that the movement or acceleration of the vehicle may correspond to the movement, or acceleration, of the accelerometer 300. The accelerometer 300 may use the displacement of the damped mass to determine when the vehicle is in motion and at what speed the car is moving.

In some aspects, the accelerometer 300 may be configured to generate a signal indicating that the car is in motion. The signal may be transmitted to a control board 304 positioned internal to the base-end unit 108. The control board 304 may include an integrated circuit, or chip, that serves as a control center for the blocking device 100. The control board 304 may receive the signal from the accelerometer 300. The control board 304 may also be coupled to the connector 200 in the clip-end unit 106 via the cable 104. The control board 304 can receive electrical signals from the connector 200 to determine if the mobile device 102 is connected to the blocking device 100. The control board 304 may include a logic gate, processing device, or other circuitry configured to send a signal to the LED light 206 and the speaker 302 in response to a determination that the vehicle is in motion and that the mobile device 102 is not connected. The LED light 206 may emit a light signal in response to receiving a signal from the control board 304. The light signal may visually indicate an event where the vehicle is in motion with the mobile device 102 disconnected from the blocking device 100. The speaker 302 may also indicate the event by emitting a tone or beep to audibly indicate to the driver that the mobile device is not connected to the blocking device 100. Although the indicator devices are described as included in the housing of the base-end unit 104 of the blocking device 100, the indicator devices may additionally or alternatively be positioned in the clip-end unit 106 of the blocking device 100. For example, the clip-end unit 106 may include the LED light 206. In other examples, either of the base-end unit 106 and the clip-end unit may include one or both of the LED light 206 and the speaker 302.

In some aspects, the control board 304 may also determine when the blocking device 100 is connected or disconnected from the port of the vehicle console 110. For example, the control board 304 may be coupled to the connector 204 to receive power from the vehicle via the connector 204 when the vehicle is on and the connector 204 is positioned in the port of the vehicle console 110. When the blocking device 100 is not properly connected to the vehicle, the control board 304 may transmit signals to the LED light 206 or the speaker 302 to indicate that the blocking device 100 is not properly connected to the vehicle. The base-end unit 108 also includes a battery 306. The battery 306 may provide temporary power to the control board 304, accelerometer 300, LED light 206, and the speaker 302 to allow the blocking device 100 to alert the driver when the blocking device 100 is not properly connected to the vehicle port even though the vehicle is not providing power to the base-end unit. The connector 204 may be coupled to the accelerometer 300, LED light 206, speaker 302, and the control board 304 to receive power from the vehicle when the car is on and transmitting power to the connector 204. The connector 204 may also be coupled to the battery 306 to charge the battery 306 when the car is on and transmitting power.

When the car is on and transmitting power to the blocking device 100, the blocking device 100 may transmit the power from the connector 204 through the cable 104 and through the connector 200 to a port in the mobile device 102 to charge a battery 308 of the mobile device 102. In some aspects, the mobile device 102 may be a cellular phone, personal digital assistant ("PDA"), tablet, or other handheld device. The mobile device may include a processing device 310 and a memory device 312 connected via a bus 314. The processing device 310 may execute instructions stored in the memory device 312 to perform operations of the mobile device 102. The processing device 310 may include a single processing device or multiple processing devices. Non-limiting examples of the processing device 310 may include a field-programmable gate array ("FPGA"), an application-specific integrated circuit ("ASIC"), a state machine, a microprocessor, etc. The memory device 312 may include any type of storage device that retains stored information when powered off. Non-limiting examples of the memory device 312 may include electrically erasable and programmable read-only memory ("EEPROM"), a flash memory, a configured processor, or any other type of non-volatile memory.

Instructions may be stored in the memory device 312 as executable code. The instructions may include processor-specific instructions generated by a compiler or an interpreter from code written in any suitable programming language. The instructions may include an application, such as a blocking engine 316, that when executed by the processing device 310, may cause the processing device 310 to prevent notifications from displaying on a display unit 318 and to generate one or more user interfaces to allow limited operation of the mobile device 102 by a user while the vehicle is in motion. The blocking engine 316 may be connected to an accelerometer 320 or a gyroscope via the bus 314. The accelerometer 320 may sense movement of the mobile device 102 and the blocking engine 316 may cause the processing device to execute instructions for receiving signals from the accelerometer 320 corresponding to the movement of the mobile device 102 when the mobile device 102 is positioned in the blocking device 100. Although the accelerometer 320 is described as a motion detector of the mobile device 102, the mobile device 102 may include any type of motion detector without departing from the scope of the present disclosure.

In some aspects, the blocking engine 316 may include instructions executable by the processing device 310 to cause the mobile device 102 to transmit information regarding a usage of the blocking device 100 by the mobile device 102 to a cloud 322. The cloud 322 may be communicatively coupled to the mobile device 102 and, in some aspects, may include virtual resources, such as a virtual storage device, for receiving and storing information received from the mobile device 102 via the cloud 322. In some aspects, the blocking engine 316 may retrieve information from the control board 304 of the blocking device 100 transmit the received information to the cloud 322 via a communication device (e.g., an antenna) of the mobile device 102. In additional and alternative aspects, the control board 304 may include a communication module, such as a cellular module, to allow the blocking device 100 to communicate information to the cloud 322 directly, separate from the communication device of the mobile device 102. The control board 304 of the blocking device 100 may receive information from components of the blocking device 100 (e.g., the accelerometer 300) that may be communicated to the cloud 322.

One example of information that may be transmitted to the cloud 322 from the blocking device 100 or the mobile device 102 includes time information corresponding to times that the blocking device 100 entered an active state, or an interval of time that the blocking device 100 remained in the active state. The blocking device 100 may be considered in an "active state" when the mobile device 102 is connected to the connector 200 of the blocking device 100, the connector 204 of the blocking device 100 is connected to the port of the vehicle, and the blocking device 100 is receiving power from the vehicle via the connector 204 (e.g., the vehicle is on). The blocking device 100 may be considered in an "inactive state" when the mobile device 102 is disconnected from the blocking device 100, when the blocking device 100 is no longer receiving power from the vehicle, or when the blocking device 100 is disconnected from the vehicle port. In some aspects, the control board 304 may determine the active state of the blocking device 100 by receiving power signals from the vehicle via the connector 204 indicating that the mobile device 102 and the blocking device 100 are connected. For example, the control board 304 may monitor the power signals and determine that the power signals are being transmitted to the mobile device 102 for charging the mobile device 102 via a connection established by the blocking device 100. In some aspects, the time information may be transmitted to the cloud 322 as raw timestamp data. For example, the blocking device 100 or the mobile device 102 may transmit messages including corresponding timestamps to the cloud 322 at both times when the blocking device 100 enters an active state and again when the blocking device 100 enters an inactive state. The information may be processed to determine times corresponding to the time of use of the blocking device 100. In other aspects, the control board 304 or the processing device 310 may process the information to determine the times prior to transmitting the information to the cloud 322.

Another example of information that may be transmitted to the cloud 322 from the blocking device 100 or the mobile device 102 includes a time corresponding to start of motion of the vehicle, or the duration of time that the vehicle is in motion. In some aspects, this information may be determined by the control board 304 based on a signal received from the accelerometer 300 indicating that the blocking device 100 is in motion. In additional aspects, the accelerometer 300 may be configured to transmit the signal only when a predetermined range of speed or acceleration of the blocking device 100 is detected. For example, the accelerometer 300 may detect when the blocking device 100 is moving at a speed above 5 miles per hour to differentiate movement of the blocking device 100 based on the motion of the vehicle from movement of the blocking device 100 based on handling of the blocking device 100 by a user. The accelerometer 300 may be configured to transmit a signal to the control board 304 only when a speed at or above 5 miles per hour is detected.

In some aspects, the information regarding the movement of the vehicle may be obtained by the mobile device 102. For example, when the mobile device 102 is connected to the blocking device 100, the accelerometer 320 of the mobile device 102 may be used to detect the motion of the vehicle. In additional and alternative aspects, the blocking device 100 or the mobile device 102 may obtain information indicating a ratio of time that the vehicle is moving and time that the blocking device 100 is connected to the mobile device 102. An additional example of information that may be transmitted to the cloud 322 from the blocking device 100 or the mobile device 102 includes a duration of time that the blocking device 100 is receiving power from the vehicle while the mobile device 102 is not connected to the blocking device 100. The control board 304 may receive power signals from the vehicle via the connector 204, but not receive a signal from the connector indicating that the mobile device 102 is connected to the blocking device. The control board 304 may determine a duration of time that the vehicle is moving while the mobile device 102 is not connected to the blocking device 100. The control board 304 can determine the duration of time based on signals from the accelerometer and the connector 200 while the blocking device 100 is disconnected from the mobile device 102. For example, the connector 200 may transmit an electrical signal to the control board 304 indicating the blocking device is not coupled to the mobile device 102. The accelerometer may transmit an electrical signal to the control board 304 indicating the vehicle is moving. The control board 304 may record a time period in which signals from the connector 200 and mobile device 102 indicate the blocking device is decoupled from the mobile device 102 and the vehicle is moving. In some aspects, the blocking device 100 may transmit information regarding the time, duration of time, or mileage that the vehicle is moving, the connection of the mobile device 102 to the blocking device 100, and the transmission of power from the vehicle to the blocking device 100, or the lack thereof, to the cloud 322. In other aspects, the blocking device 100 may transmit this information to the mobile device 102 for transmission to the cloud 322.

In some aspects, the information received by the cloud 322 may be time stamps corresponding to starting times and stopping times of measured activities of the mobile device 102 and the blocking device 100. In other aspects, the information received by the cloud 322 may be time intervals or the associated mileage corresponding to the measured activities. In additional aspects, the cloud 322 may be communicatively coupled to a remote database 324 that may download or otherwise transmit from the cloud 322 the information transmitted to the cloud 322 by the blocking device 100 or the mobile device 102. The information may be retrieved from the remote database 324 by the mobile device 102 or another computing device and analyzed to determine the metrics corresponding to the use of the blocking device 100. In some aspects, the information may also be accessible by the mobile device 102 from the cloud 322 for displaying on the display unit 318. For example, the blocking engine 316 may cause the processing device 310 to generate user interfaces to display a total amount of time or number of miles that a user has traveled using the blocking device 100.

In some aspects, the blocking engine 316 may also include instructions executable by the processing device 310 to cause the mobile device 102 to launch a mobile application in response to the blocking device 100 entering an active state. For example, the control board 304 may turn on a Bluetooth transceiver and search for the mobile device 102 when a connection to the vehicle is detected via the connector 204 or when a movement of the vehicle is detected. The control board 304 may transmit a signal to the mobile device 102 when a connection to the mobile device is detected via the connector 200 and motion is detected via the accelerometer 300. The mobile application may include one or more user interfaces that mask notifications received by or generated by the mobile device 102 such that the notifications are not displayed to the user. In some examples, the one or more user interfaces can include one or more selectable icons associated with predetermined functions (e.g., playing music or receiving navigation assistance). In some aspects, the selectable icons may allow the user to launch other mobile applications installed in the memory device 312 that are associated with the predetermined functions. In additional or alternative aspects, the selectable icons may allow the user to select a set of other mobile applications from which notifications are displayed. For example, one of the selectable icons may be selected to cause a list of navigation capable applications that are installed on the device to be displayed. The mobile application may allow navigation notifications from a navigation application to be displayed in response to the user selecting the navigation application from the list of navigation capable applications. The mobile application may determine the mobile applications to associate with the selectable icons by analyzing a digital tag associated with the mobile applications installed on the mobile device 102 or by analyzing an output of the mobile applications.

In additional and alternative aspects, the blocking device 100 and the mobile device 102 may include Bluetooth capabilities. In some aspects, a Bluetooth communication module may be positioned in the housing of the base-end unit 104 of the blocking device 100. In other aspects, a Bluetooth communication module may be positioned in the housing of the clip-end unit 106. In one example, the blocking device 100 and the mobile device 102 may be paired via a Bluetooth connection and configured to communicative wirelessly via the Bluetooth connection.

In some aspects, the blocking device 100 may transmit a message to the mobile device 102 via the Bluetooth pairing when the blocking device 100 is connected to the vehicle, motion is detected by the accelerometer 300, and the mobile device 102 is not connected to the blocking device 100. In this event, the blocking device 100 may transmit a message signal to the mobile device 102 via the Bluetooth pairing and the mobile device 102 may transmit a message to the cloud 322 reporting the event. In some aspects, the Bluetooth communication module of the blocking device 100 may be powered by the battery 306 when the blocking device 100 is not receiving power from the vehicle via the connector 204. For example, the battery 306 may be actuated in response to the accelerometer 300 detecting motion. In an event where the blocking device 100 is not plugged into the car and the car is in motion (as detected by the accelerometer 300), the battery 306 will turn on and provide power to the Bluetooth communication module of the blocking device 100 to allow the blocking device 100 to communicate the event to the mobile device 102 via the Bluetooth pairing. The mobile device 102 may then report the event to the cloud 322.

Figure 4:
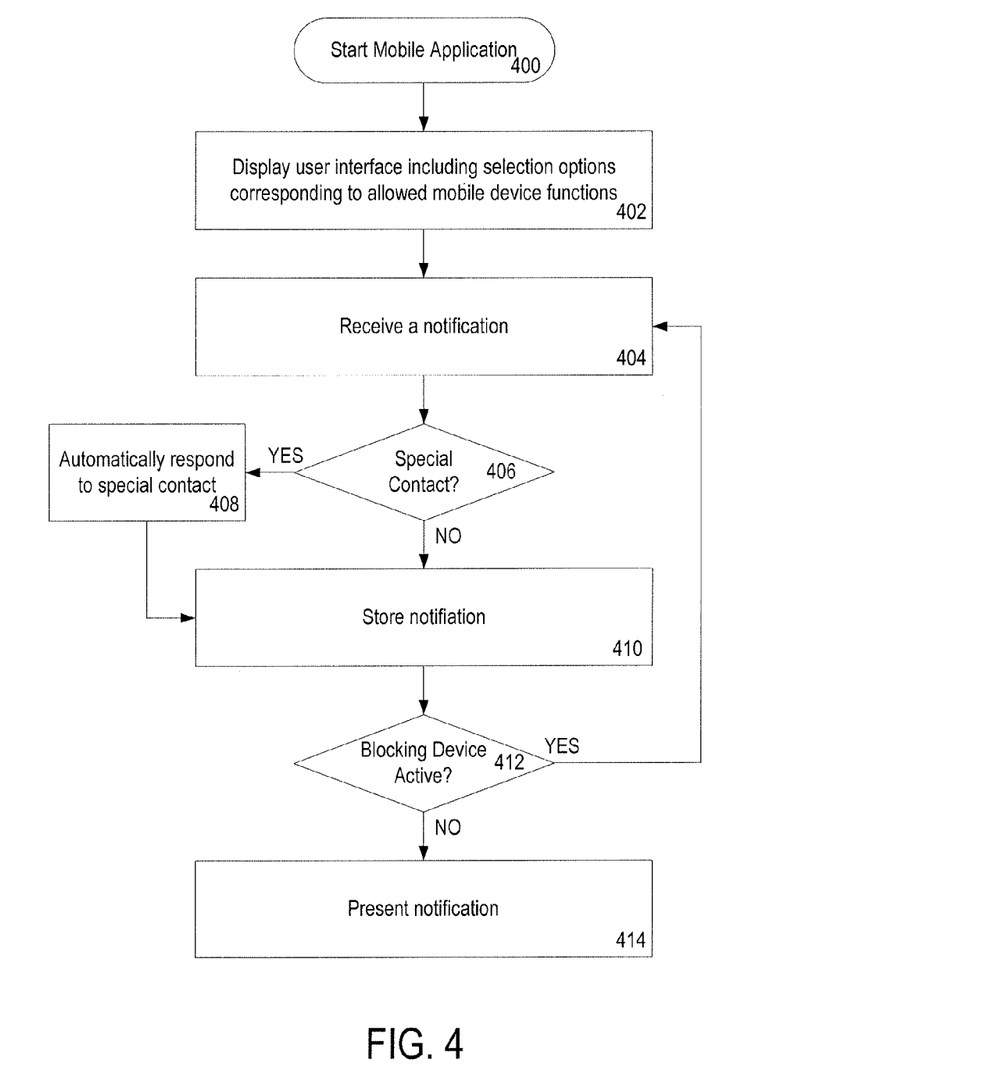
FIG. 4 is a flow chart of an example of a process for managing notifications received by a mobile device according to some aspects of the present disclosure.

FIG. 4 is a flow chart describing an example of a process for managing notifications received by the mobile device 102 according to some aspects of the present disclosure.

In block 400, the blocking engine 316 may launch a mobile application installed on the mobile device 102 for managing notifications received by the mobile device 102 when a vehicle is in motion. The mobile device 102 may be connected to the connector 200 of the blocking device 100. Upon the blocking device 100 entering an active state, the control board 304 may transmit a signal to the mobile device 102 indicating that the blocking device 100 is in the active state. For example, the control board 304 may generate a signal and transmit the signal to the mobile device 102 via the connector 200. In response, the blocking engine 316 may launch the mobile application. In other aspects, the blocking engine 316 may launch the mobile application in response to an input from a user of the mobile device 102. For example, the mobile device 102 may include a selectable icon on the display unit 318 corresponding to the mobile application. In response to a selection of the selectable icon by the user, the blocking engine 316 may cause the mobile device 102 to launch the mobile application. The user may then connect the mobile device 102 to the blocking device 100 and position the shield 202 to prevent access to the home button of the mobile device 102.

In block 402, the blocking engine 316 may cause the processing device 310 to generate one or more user interfaces. The user interfaces may include any number of selectable icons corresponding to allowable functionalities of the mobile device 102 while the vehicle is in motion. For example, one selectable icon may correspond to a music application previously downloaded in the memory device 312 of the mobile device 102. The selectable icon may allow a user to play music stored on the mobile device 102 or streamed through the mobile device 102 while the blocking device 100 is in an active state. In another example, a selectable icon may correspond to a navigation application. In some examples, the user interfaces may also include selectable icons that allow the mobile device 102 to receive or transmit voice calls while the vehicle is in motion. In some aspects, the call functionalities of the mobile device 102 may only be accessible via a Bluetooth connection, auxiliary, or other hands-free function.

In block 404, the blocking engine 316 may receive a notification transmitted to the mobile device 102. The notification may be received from an external source via a connection device (e.g., antenna) of the mobile device 102. Non-limiting examples of the notification may include a text message, a Facebook® message, a Snapchat® message, a tweet, an email, and an iMessage® message.

In block 406, the blocking engine 316 may determine if the notification was received by the mobile device 102 from a special contact. In some aspects, subsequent to downloading the mobile application, the blocking engine 316 may allow a user to select one or more contacts as special contacts. In some aspects, the special contacts may be a subset of contacts previously stored in the memory device 312 of the mobile device 102. The subset of contacts may be one, some, or all of the contacts previously stored in the memory device 312. In other aspects, the special contacts may be a separate list of contacts identified by the user when establishing the settings of the mobile application. The list of special contacts may be modified by the user at any time when the blocking device 100 is not active.

In block 408, the blocking engine 316 may automatically respond to the notification subsequent to a determination that the notification was received by the mobile device 102 from a special contact. In some aspects, the automatic response may be a message in the same format as the medium (e.g., the mobile application format) of the received notification. For example, in response to receiving a notification in the form of a text message, the response may be sent as a text message. In some aspects, the automatic response may be a pre-set response, such as "I'm driving right now. I'll respond soon." In other aspects, the automatic response may be a unique message previously entered by the user.

In block 410, the notification is stored in the memory device 312. The notification may be stored in the memory device 312 in response to a notification received from a special contact or a notification received from another contact or non-contact. In some aspects, blocking engine 316 may also mute or otherwise prevent an alert corresponding to the notification. For example, the mobile device 102 may be configured to vibrate or emit an audible sound in response to receiving a notification. The blocking engine 316 may override the normal configuration of the mobile device 102 to prevent the alert associated with the notification.

In block 412, the blocking engine 316 may determine if the blocking device 100 is still in an active state. In some aspects, the blocking engine 316 may receive one or more additional signals from the control board 304 indicating that the blocking device 100 remains in motion (corresponding to the movement of the car) and continues to receive power from the vehicle (indicating that the blocking device 100 is still electrically connected to the vehicle). In some aspects, the mobile device 102 may determine movement of the mobile device 102 corresponding to a movement of the vehicle via the accelerometer 320. The blocking engine 316 may determine that the blocking device 100 is in an active state when the mobile device 102 is receiving the power signal from the vehicle and a signal from the accelerometer 320 indicating that the mobile device 102, and, by extension, the vehicle is in motion. In response to a determination that the blocking device 100 is still in an active state, the blocking engine 316 may continue to receive and store any notifications received until a determination that the blocking device 100 is no longer active. In response to a determination that the blocking device 100 is no longer active, the process may proceed to block 416. In block 414, the blocking engine 316 may retrieve the notifications received during the time that the blocking device 100 was active and may present the notifications sequentially or simultaneously on the display unit 318.

Figure 5:
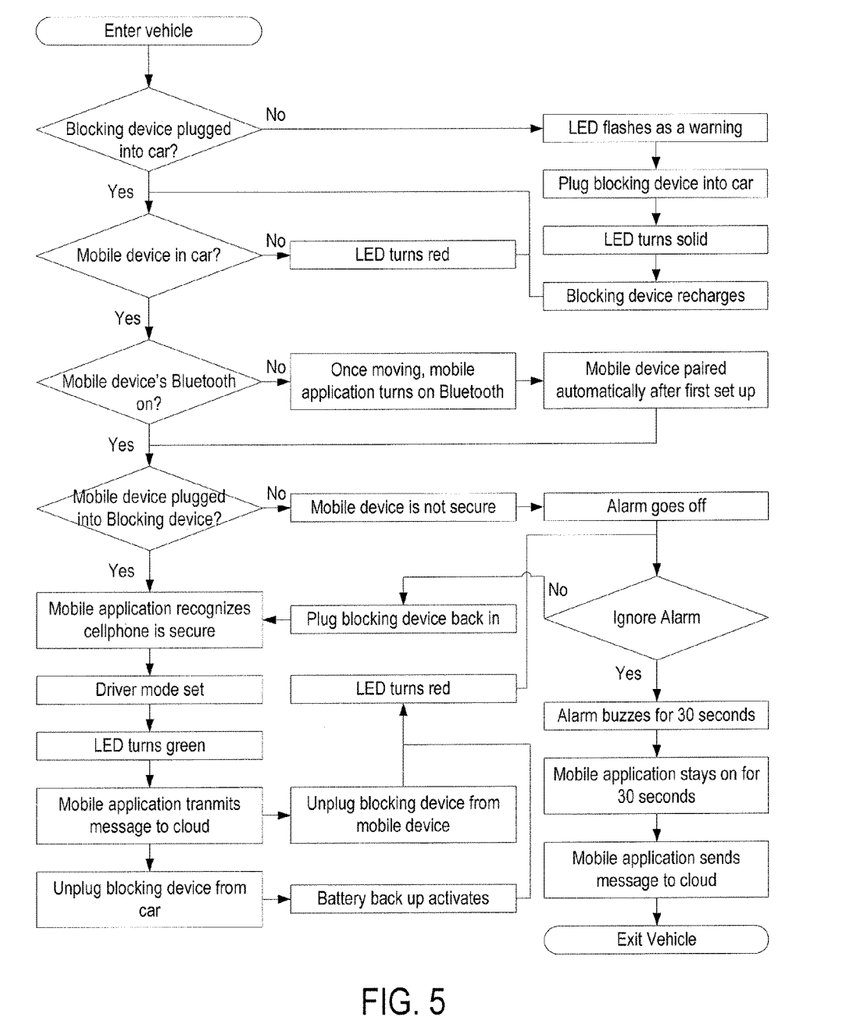
FIG. 5 is a flow chart of an example of a process for using a blocking device according to one aspect of the present disclosure.

FIG. 5 is a flow chart illustrating an example of a process for using the blocking device 100 according to some aspects of the present disclosure.

A user (e.g., John) may get into a vehicle having the blocking device 100. When the blocking device 100 is not connected to the vehicle port, the battery 306 may actuate and cause the LED light 206 to flash a warning in response to detecting movement of the vehicle. In response, the user may connect the blocking device 100 to the vehicle port which causes the LED light 206 to stop flashing and turn a solid color (e.g., green). The battery 306 of the blocking device 100 may be recharged by power transmitted to the blocking device 100 from the vehicle port. Where the blocking device 100 is connected to the vehicle port, but the user does not have the mobile device 102 in the vehicle, the LED light 206 may turn a predetermined color (e.g., red).

Where the user has the blocking device 100 and the mobile device 102 in the vehicle, the blocking device 100 may attempt to communicatively couple to the mobile device 102 via a Bluetooth pairing. If the Bluetooth communication module of the mobile device 102 is not enabled, the blocking engine 316 of the mobile device 102 may cause the application on the mobile device 102 to enable the Bluetooth communication module once the accelerometer of the mobile device 102 detects movement. Once the Bluetooth communication module of the mobile device 102 is enabled, the blocking device 100 may determine if the mobile device 102 is connected to the blocking device 100.

Where the mobile device 102 and the blocking device 100 are not connected, an alarm may go off via the speaker 302. The alarm may beep for 30 seconds or until the user connects the blocking device 100 and the mobile device 100. If, after thirty seconds the mobile device 102 is not connected to the blocking device 100, the application on the mobile device 102 may transmit a message to the cloud 322. Once the user connects the mobile device 102 to the blocking device, the application may recognize the mobile device 102 is secure and enter an active mode. The LED light 206 may turn green and a message may be transmitted to the cloud reporting the event from the mobile device 102.

If at some point during the active state of the blocking device 100, the user disconnects the mobile device 102 from the blocking device 100, the LED light 206 may turn from green to red and the alarm may be actuated by the speaker 302. If at some point during the active state of the blocking device 100, the user disconnects the blocking device 100 from the vehicle port, the battery 306 may be actuated to turn the LED light 206 from green to red and to actuate the speaker 302 to alarm.

Although the blocking device 100 is depicted in FIGS. 1-3 as a separate device from the vehicle, other implementations are possible. In some examples, the vehicle can include a docking bay that includes the clip end-unit 106. In additional or alternative examples, the docking bay can include a wireless connector for wirelessly connecting the docking bay to a wireless port in a mobile device. The mobile device may be positioned in the docking bay or the mobile device may wirelessly connect to the wireless connector in response to being positioned in the vehicle. The connector (wired or wireless) can enable the docking bay to wirelessly charge the mobile device and to transmit a launch signal to the mobile device for causing the mobile device to launch a mobile application. A shield included in the docking bay may prevent user access to a home button of a mobile device positioned in the docking bay. The docking bay may include the components in the base-end unit 108 or communicatively coupled to components in the vehicle for performing similar operations. For example, a processing device included in the vehicle can determine the vehicle is in motion and transmit a signal via the docking bay to the mobile device.

In additional or alternative examples, the mobile device can be coupled to the vehicle via an on-board diagnostic ("ODB") port. The ODB port may be a physical or a wireless port for communicatively coupling to the mobile device with a physical cable or wirelessly via Bluetooth or another wireless communications protocol. In some aspects, the control board can be embedded in the vehicle as part of the on-board diagnostics circuitry. In additional or alternative aspects, the control board can be communicatively coupled to sensors (e.g., an accelerometer) and output devices (e.g., LEDs) embedded in the vehicle. For example, a processing device included in the vehicle can be coupled to the control board and control various LEDs and other indicators to alert the driver to different states of the blocking device. For example, the processing device may control LEDs in the dashboard or included in the docking bay. In additional or alternative examples, the processing device may control the car's speaker system or a speaker in the docking bay. The docking bay can be coupled to an accelerometer in the vehicle for determining a rate of movement of the vehicle. In some aspects, the docking bay can be manufactured as part of the console 110 or coupled to the console 110 as an aftermarket component.

The foregoing description of the examples, including illustrated examples, of the invention has been presented only for the purpose of illustration and description and is not intended to be exhaustive or to limit the invention to the precise forms disclosed. Numerous modifications, adaptations, and uses thereof will be apparent to those skilled in the art without departing from the scope of this invention. The illustrative examples described above are given to introduce the reader to the general subject matter discussed here and are not intended to limit the scope of the disclosed concepts.

What is claimed is:

1. A system for minimizing driver distractions from a mobile device, the system comprising:
   a blocking device including:
      a first end including a first connector coupleable to a first port of the mobile device;
      a second end including a second connector coupleable to a second port of a vehicle to receive a power signal from the vehicle;
      a cable connecting the first end and the second end; and
      a control board configured to:
         determine when movement of the vehicle exceeds a threshold value; and
         communicate a launch signal to the mobile device in response to determining that the movement of the vehicle exceeds the threshold value; and
   a blocking engine for operating on the mobile device to:
      receive the launch signal from the control board; and launch a mobile application on the mobile device, the mobile application for delaying a display of a notification received by the mobile device while the blocking device is coupled to the mobile device until the blocking device is decoupled from the mobile device.

2. The system of claim 1, wherein the first end of the blocking device further includes a shield positionable to block user access to a home button of the mobile device when the first connector is positioned in the first port, wherein the control board is located in the second end of the blocking device.

3. The system of claim 1, wherein the blocking device further comprises: at least one output device for outputting an audible or visible signal and wherein the control board is configured to control the output device based on a state of the blocking device.

4. The system of claim 1, wherein the blocking device receives the power signal from the vehicle via the second connector and provides the power signal to the mobile device via the first connector.

5. The system of claim 1, wherein the blocking device further includes a battery for powering the control board when the blocking device is disconnected from the second port of the vehicle or the power signal from the vehicle is inactive.

6. The system of claim 1, wherein the blocking device further includes an accelerometer to detect the movement of the vehicle.

7. The system of claim 1, wherein the blocking device further includes a wireless interface for communicating with a wireless interface of the mobile device.

8. A method for minimizing driver distractions from a mobile device, the method comprising:
    determining, by a blocking device, that a first connector included in a first end of the blocking device is coupled to a first port of the mobile device, wherein the blocking device includes the first end and a second end and a cable connects the first end and the second end;
    determining, by the blocking device, that a second connector included in the second end of the blocking device is coupled to a second port of a vehicle;
    determining, by the blocking device, that a movement of the vehicle exceeds a threshold value; and
    transmitting, by the blocking device, a launch signal to the mobile device via the first connector in response to determining the movement of the vehicle exceeds the threshold value, the launch signal for causing the mobile device to launch a mobile application on the mobile device that prevents a notification received by the mobile device from being displayed on a display device while the blocking device is coupled to the mobile device.

9. The method of claim 8, further comprising:
    determining, by the blocking device, that the first connector is separate from the first port of the mobile device; and
    outputting an audible or a visible signal in response to determining that the movement of the vehicle exceeds the threshold value and that the first connector is separate from the first port of the mobile device.

10. The method of claim 8, further comprising:
    blocking, by the blocking device, user access to a home button of the mobile device with a shield included in the first end of the blocking device when the first connector is positioned in the first port; and
    receiving a power signal from the vehicle via the second connector and providing the power signal to the mobile device via the first connector.

11. The method of claim 8, further comprising:
    determining, by the blocking device, that the first connector is decoupled to the first port of the mobile device; and
    transmitting, by the blocking device, an alert signal to the mobile device via a wireless interface for causing the mobile device to indicate to a driver that the blocking device is disconnected from the mobile device.

12. The method of claim 8, further comprising:
    recording data indicating whether the first connector is coupled to the first port of the mobile device while the movement exceeds the threshold value;
    determining that the first connector is decoupled to the first port of the mobile device; and
    transmitting the data to a remote server in response to determining that the first connector is decoupled to the first port of the mobile device.

13. The method of claim 8, further comprising:
    receiving, by the mobile application, the notification from a remote device over a wireless network while the first connector is coupled to the first port of the mobile device;
    determining, by the mobile application, that the notification is from a non-exempt list of notifications;
    preventing the notification from being displayed on the display device while the first connector is coupled to the first port of the mobile device;
    determining, by the mobile application, that the first connector is decoupled from the first port of the mobile device;
    displaying, by the mobile application, the notification in response to determining that the first connector is decoupled from the first port of the mobile device;
    determining, by the mobile application, that the remote device is associated with a contact in a predetermined list; and
    transmitting, by the mobile application, a predetermined response to the remote device in response to determining that the remote device is associated with the contact.

14. A cable for minimizing driver distractions from a mobile device, the cable comprising:
    a first end including:
        a first connector coupleable to a first port of the mobile device; and
        a shield positionable to block user access to a home button of the mobile device when the first connector is positioned in the first port;
    a second end including a second connector coupleable to a second port of a vehicle to receive a power signal from the vehicle; and
    a control board configured to transmit a launch signal to the mobile device via the first connector in response to determining a movement of the vehicle exceeds a threshold value, the launch signal for causing the mobile device to launch a mobile application on the mobile device, the mobile application for delaying a display of a notification received by the mobile device while the first connector is coupled to the mobile device.

15. The device of claim 14, wherein the control board is further configured to operate in an active state when the control board is receiving the power signal via the second connector and the mobile device is connected to the control board via the first connector, the mobile application for causing the notification received by the mobile device when the control board is in the active state to be stored in a memory device of the mobile device and prevented from being displayed on a display, and for causing the notification to be displayed on a display unit in response to the control board changing from the active state to an inactive state.

16. The device of claim 14, further comprising:
an accelerometer device configured to transmit a motion signal in response to detecting the movement of the vehicle, wherein the control board is communicatively coupled to the accelerometer for receiving the motion signal and determining the movement of the vehicle exceeds the threshold value based on the motion signal; and
one or more indicators communicatively coupled to the control board to receive an alert signal from the control board indicating that the first connector is not positioned in the first port of the mobile device and configured to emit an audible alert or a visual alert in response to receiving the alert signal
wherein the second port on the vehicle is an on-board diagnostics port.

17. The device of claim 16, wherein the one or more indicators are communicatively coupled to the control board to further receive a different alert signal from the control board indicating that the second connector is not positioned in the second port of the vehicle and configured to emit a different audible alert or a different visual alert to the driver in response to receiving the different alert signal.

18. The device of claim 16, wherein the one or more indicators are communicatively coupled to the control board to further receive a different alert signal from the control board indicating that the mobile device is outside a wireless range of the control board and configured to emit a different audible alert or a different visual alert to the driver in response to receiving the different alert signal.

19. A system embedded in a vehicle for minimizing driver distractions from a mobile device, the system comprising:
a docking bay that defines an inner area for positioning a mobile device, the docking bay including a connector coupleable to the mobile device, the docking bay being coupled to a power system of the vehicle for receiving a power signal from the vehicle; and
a control board coupled to the docking bay configured to transmit a launch signal to the mobile device via the connector in response to determining a movement of the vehicle exceeds a threshold value, the launch signal for causing the mobile device to launch a mobile application on the mobile device, the mobile application for delaying a display of a notification received by the mobile device while the connector is coupled to the mobile device,
wherein the control board is further configured to operate in an active state when the mobile device is connected to the control board via the connector, wherein the mobile application is operable for causing the notification received by the mobile device when the control board is in the active state to be stored in a memory device of the mobile device and prevented from being displayed on a display unit, and for causing the notification to be displayed on the display unit in response to the control board changing from the active state to an inactive state.

20. The system of claim 19, wherein the connector included in the docking bay is a wireless connector for wirelessly coupling the docking bay to a wireless port of the mobile device, wherein the docking bay is configured to wirelessly charge the mobile device by wirelessly transmitting the power signal to the mobile device via the wireless connector.

21. The system of claim 19, wherein the connector included in the docking bay is a physical connector for physically coupling the docking bay to a port of the mobile device, wherein the docking bay is configured to charge the mobile device by transmitting the power signal to the mobile device via the physical connector.

22. The system of claim 21, wherein the docking bay includes a shield that blocks user access to a home button of the mobile device when the physical connector is positioned in the port of the mobile device.

23. The system of claim 19, wherein the control board forms a portion of an on-board diagnostic board for the vehicle, wherein the docking bay is further coupled to the vehicle and the control board via an on-board diagnostic port, wherein the control board is communicatively coupled to an accelerometer embedded in the vehicle for determining the movement of the vehicle.

* * * * *